(12) United States Patent
Chen et al.

(10) Patent No.: US 6,791,751 B2
(45) Date of Patent: Sep. 14, 2004

(54) THREE-PORT OPTICAL POLARIZATION COMBINER

(75) Inventors: Ming-Hung Chen, Taipei (TW); Chen-Bin Huang, Hsinchu (TW); Chieh Hu, Taichung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 150 days.

(21) Appl. No.: 10/336,735

(22) Filed: Jan. 6, 2003

(65) Prior Publication Data

US 2004/0080827 A1 Apr. 29, 2004

(30) Foreign Application Priority Data

Oct. 25, 2002 (TW) ........................................ 91125278 A

(51) Int. Cl.[7] ................................................ G02B 5/30
(52) U.S. Cl. ........................................ 359/497; 359/495
(58) Field of Search ................................. 359/497, 496, 359/640, 454, 495, 639; 385/11

(56) References Cited

U.S. PATENT DOCUMENTS 6,331,913 B1 12/2001 Huang et al. ............... 359/497

*Primary Examiner*—Hung X. Dang
(74) *Attorney, Agent, or Firm*—Birch, Stewart, Kolasch & Birch, LLP

(57) ABSTRACT

A three-port optical polarization combiner is disclosed. It is used for combining two optical pump beams to increase optical pumping power in a DWDM optic fiber transmission system. The combiner will combine two beams with orthogonal polarizations into one and transmit it to another port for output. By non-reciprocal effect of a half-wave plate and a Faraday rotator, the reverse noise will be blocked to improve transmission quality and protect the laser lens.

10 Claims, 4 Drawing Sheets

THREE-PORT OPTICAL POLARIZATION COMBINER

This nonprovisional application claims priority under 35 U.S.C. § 119(a) on Patent Application No. 091125278 filed in TAIWAN, R.O.C. on Oct. 25, 2002, which is herein incorporated by reference.

BACKGROUND OF THE INVENTION

1. Field of Invention

The invention relates to a three-port polarization combiner used in a DWDM optic fiber transmission system. In particular, it relates to a passive high-power three-port polarization combiner that can block reverse noises.

2. Related Art

In such an information-dominated era, information communications often become the key factor to great success. The rapid development of the Internet has further made the world as a global village and brought closer the distance among people. It also facilitates the information transmission speed. As the transmission distance and data flow become larger, the need for a higher optical pumping power is more severe.

Because of the above-mentioned requirement, the erbium-doped fiber amplifier (EDFA) and the Raman amplifier appear to be very important. Since the power of existing lasers is insufficient, a set of EDFA and Raman amplifier has to be installed every 40 km along the transmission route. This inevitably increases the cost of the fiber transmission equipment and complicates the maintenance.

To solve this problem, a three-port passive is disclosed to combine two optical pump beams to increase optical pumping power in a DWDM optic fiber transmission system. It provides a high laser power combiner as the pumping source of the EDFA and the Raman amplifier. A photo blocking device is further provided to block reverse noises in the optic fiber communication system, enhancing the system quality.

To provide such a device, many method have been proposed. For example, the U.S. Pat. No. 6,331,913 disclosed a device with combining and separating polarization beams. However, it has the problems of a complicated structure, a higher cost, and a large volume. Moreover, it does not have the function of blocking reverse noises. Therefore, a separate photo blocking device is required.

SUMMARY OF THE INVENTION

In view of the foregoing, the invention discloses a three-port optical polarization combiner connected to three optical ports to provide high power. It has a smaller volume and lower cost.

Using the disclosed three-port optical polarization combiner, two optical beams with orthogonal polarizations entering two ports are combined and output via another port.

Another objective of the invention is to provide a three-port optical polarization combiner with the function of blocking reverse noises.

According to the invention, a half-wave plate and a Faraday rotator are inserted into the optical path. By non-reciprocal effect of a half-wave plate and a Faraday rotator, the reverse noise will be blocked to improve transmission quality and protect the laser lens.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
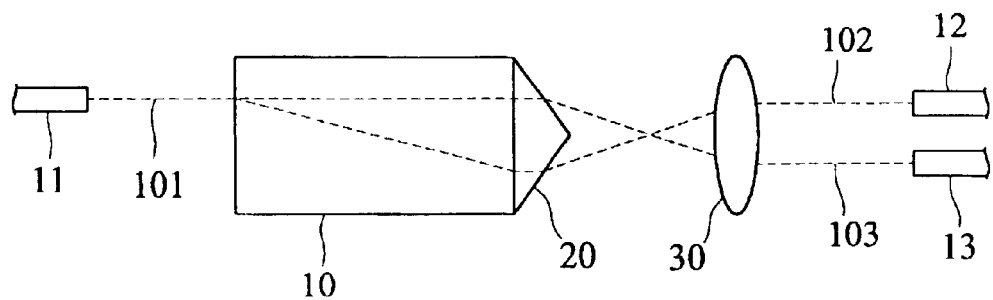
FIG. 1 is a schematic view of the first embodiment of the disclosed bi-directional three-port polarization combiner.

FIG. 1 shows the three-port optical polarization combiner. The combiner has a birefringent crystal 10, a wedge crystal 20, and a non-spherical lens 30. One side of the birefringent crystal 10 is a first optical port, and the other side is attached to the wedge crystal 20 on its flat plane. The non-spherical crystal 30 is disposed among the wedge crystal 20, a second optical port 12, and a third optical port 13. After a first beam 101 output from the first optical port 11 enters the birefringent crystal 10, it is split into a second beam 102 and a third beam 103 with orthogonal polarizations. The beams are then deflected by the wedge crystal 20 to enter the non-spherical crystal 30. Finally, the second and third beams enter the second optical port 12 and the third optical port 13. Reversing the optical path, the second beam 102 and the third beam 103 output from the second optical port 12 and the third optical port 13 and with orthogonal polarizations are combined to enter the first optical port 11. This is a first embodiment of the bi-directional three-port optical polarization combiner.

Figure 2:
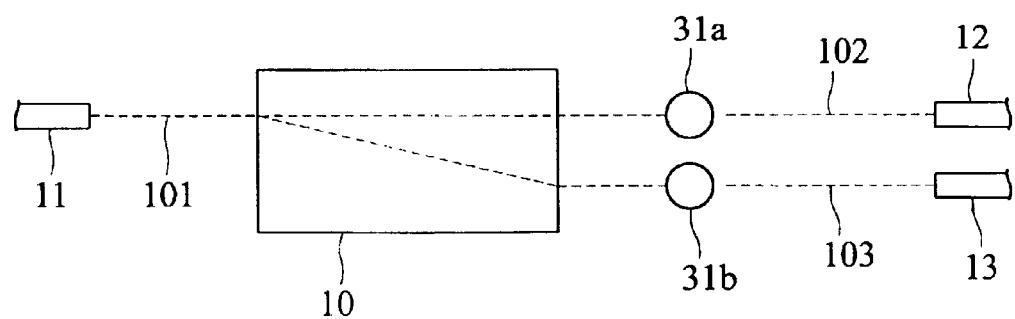
FIG. 2 is a schematic view of the second embodiment of the disclosed bi-directional three-port polarization combiner.

FIG. 2 shows a second embodiment of a bi-directional threeport optical polarization combiner. As shown in the drawing, the combined contains a birefringent crystal 10 and two spherical lenses 31a, 31b installed among the first optical port 11, the second optical port 12, and the third optical port 13. The birefringent crystal 10 is installed close to the first optical port 11, while the spherical lenses 31a, 31b are installed close to the second optical port 12 and the third optical port 13. After the first beam 101 output from the first optical port 11 enters the birefringent crystal 10, it is split into the second beam 102 and the third beam 103 with orthogonal polarizations. The beams 102, 103 enter the spherical lenses 31a, 31b, respectively, and are deflected into the second optical port 12 and the third optical port 13. Likewise, the reverse operation of the device can combine the second beam 102 and the third beam 103 output from the second optical port 12 and the third optical port 13 and with orthogonal polarizations to enter the first optical port 11. The above-mentioned two embodiments are about bi-directional three-port optical polarization combiners. Due to their bi-directional property, they can be used as three-port polarization beam separators. Therefore, an additional photo blocking device has to be used to block reverse noises in an optic fiber communication system.

Figure 3A:
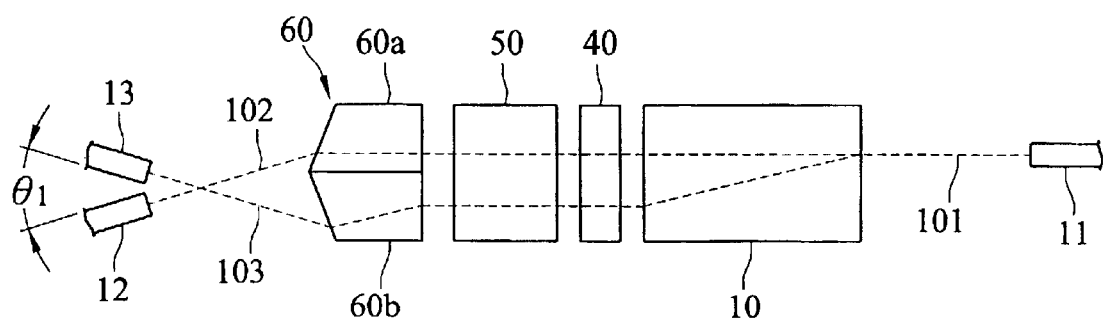
FIG. 3A is a schematic view of the first combiner embodiment of the disclosed one-directional three-port polarization combiner.
Figure 3B:
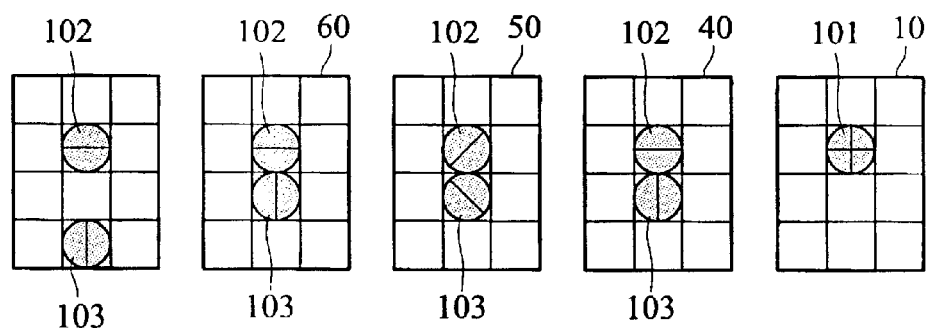
FIG. 3B shows the polarization state of FIG. 3A.

The first embodiment of the one-directional three-port optical polarization combiner is shown in FIG. 3A. Please also refer to FIG. 3B for the polarization states at the cross sections of each unit. First, the second beam 102 and the third beam 103 output from the second optical port 12 and the third optical port, respectively, have orthogonal polarizations. They enter the slant sides of two wedge birefringent crystals 60a, 60b so that beams polarized in particular directions will be shifted. The shifted beams enter the Faraday rotator 50 and rotate a predetermined angle. After going through the half-wave plate 40, the beams are rotated by the same predetermined angle, so that the polarization states of the beams do not change (see FIG. 3B). The predetermined rotation angle is preferably 45 degrees. Therefore, the angle between the optical axis of the half-wave plate 40 and the polarization direction of the incident beam is 22.5 degrees. The magnetic field of the Faraday rotator 50 is along this direction. For example, if the second beam is an odd ray (O-ray) with respect to the wedge birefringent crystal 60a, then the beam moves along its original direction. The third beam 103 is an even ray (E-ray) with respect to the wedge birefringent crystal 60b; therefore, it experiences a shift. After successively passing through the Faraday rotator 50 and the half-wave plate 40, it is rotated first counterclockwise and then clockwise by 45 degrees, returning to the original polarization state. Through the effect of the birefringent crystal 10, the beams are combined into the first beam 10 to enter the first optical port 11.

When operated in the reverse order, the first beam 101 output from the first optical port 11 enters the birefringent crystal 10 and splits into the second beam 102 (assuming an O-ray) and the third beam 103 (assuming an E-ray) with orthogonal polarizations. The two beams 102, 103 then enter the half-wave plate 40. Due to the reciprocal property, the polarizations of the two beams are rotated counterclockwise by 45 degrees (resulting in the same states as the reversed incident beams). However, the Faraday rotator 50 has the non-reciprocal property. Therefore, the polarization states of the beams are further rotated by 45 degrees, resulting in a total rotation of 90 degrees. The second beam 102 entering the wedge birefringent crystal 60a is an E-ray and the third beam 103 entering the wedge birefringent crystal 60b is an O-ray. The second beam 102 is shifted and deviates from the original incident path. Likewise, the third beam 103 also has a different path from the original one. The angle between the second beam 102 and the third beam 103 is $\theta_2$, different from the angle $\theta_1$ between the second optical port 12 and the third optical port 13 (see FIG. 3A). Thus, the beams cannot enter the second optical port 12 and the third optical port 13. This can effectively block reverse light beams.

Figure 4A:
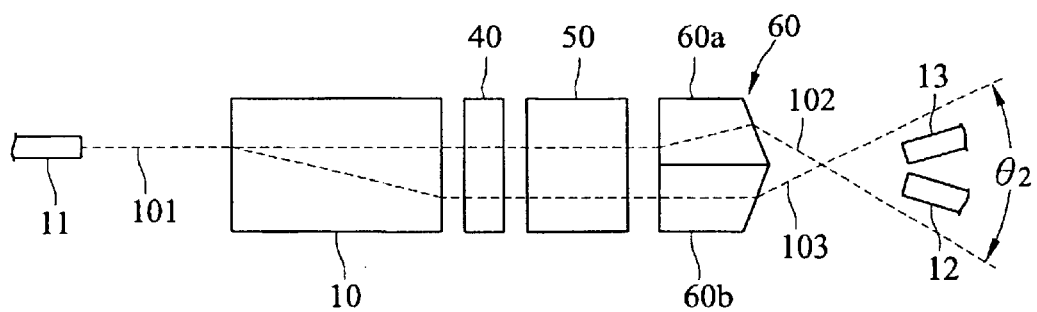
FIG. 4A is a schematic view of the first separator embodiment of the disclosed one-directional three-port polarization combiner.
Figure 4B:
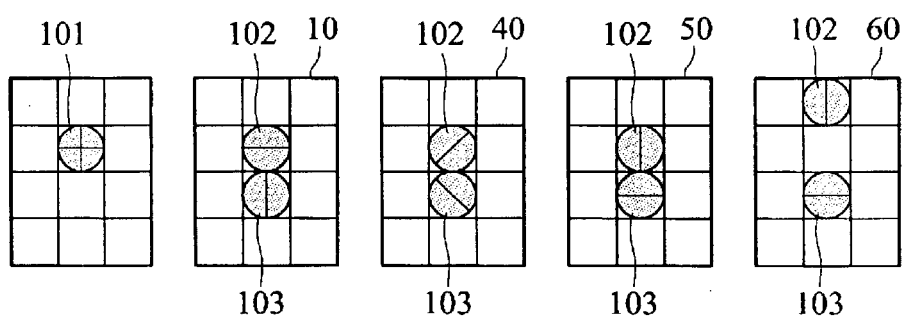
FIG. 4B shows the polarization state of FIG. 4A.
Figure 5A:
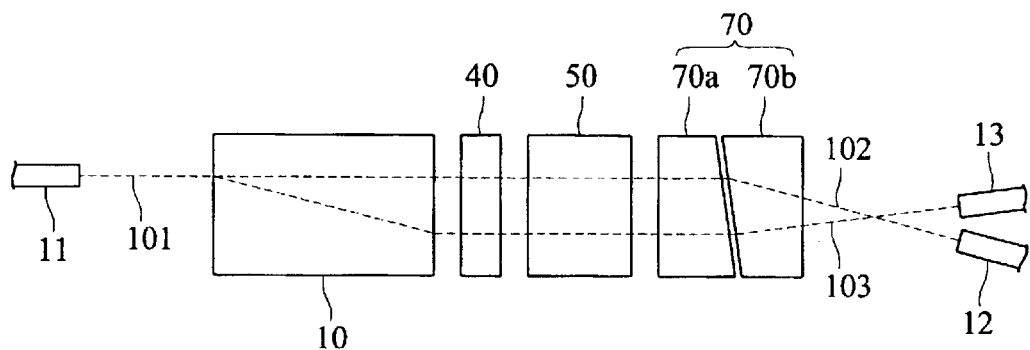
FIG. 5A is a schematic view of the second combiner embodiment of the disclosed one-directional three-port polarization combiner.
Figure 5B:
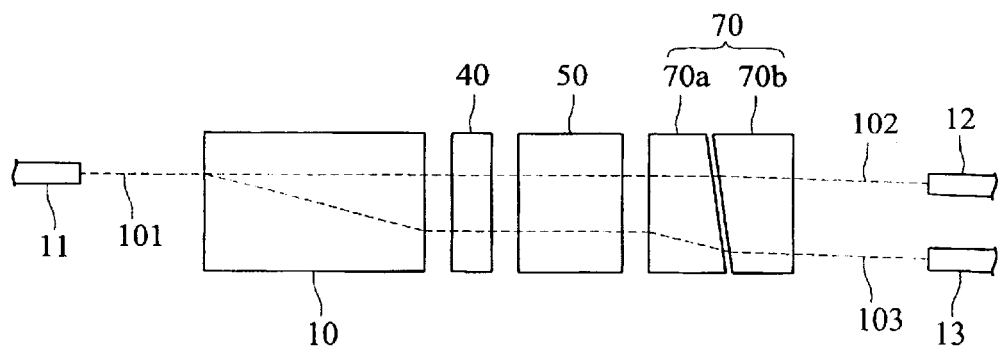
FIG. 5B is a schematic view of the second separator embodiment of the disclosed one-directional three-port polarization combiner.

The second embodiment of the one-directional three-port optical polarization combiner is shown in FIGS. 5A and 5B. The principle is basically the same as the first embodiment shown in FIGS. 4A and 4B. However, a Wollaston lens 70 is used to replace the wedge birefringent crystals 60a, 60b. The Wollaston lens 70 consists of two wedge birefringent crystals 70a, 70b with perpendicular optical axes placed in parallel. The slant sides face each other. It can achieve the same effect of shifting beams of a particular polarization state. By the non-reciprocal property of the Faraday rotator 50, it can block the reverse noises.

Effects of the Invention

The invention provides a three-port optical polarization combiner for combining the beams with orthogonal polarizations into one beam, outputting from another port. Using the non-reciprocal property of the half-wave plate and the Faraday crystal, the reverse noise can be blocked to improve transmission quality and protect the laser lens.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A three-port optical polarization combiner installed among a first optical port, a second optical port, and a third optical port, the second optical port being disposed on the same side as the third optical port, the three-port optical polarization combiner comprising:

a non-spherical lens, which is installed on the same side as the second optical port and the third optical port for receiving beams with orthogonal polarizations output from the second optical port and the third optical port and deviating their output directions;

a wedge crystal, which receives beams with orthogonal polarizations output from the non-spherical lens and deviating their output directions; and a birefringent crystal, which is in direct contact with the wedge crystal and installed on the same side as the first optical port for receiving beams with orthogonal polarizations output from the wedge crystal and combining them into the first optical port.

2. The three-port optical polarization combiner of claim 1, wherein the wedge crystal is in direct contact with the birefringent crystal by a plane.

3. A three-port optical polarization combiner installed among a first optical port, a second optical port, and a third optical port, the second optical port being disposed on the same side as the third optical port, the three-port optical polarization combiner comprising:

two birefringent crystals, which are installed on the same side as the second optical port and the third optical port for receiving beams with orthogonal polarizations output from the two optical ports and deviating the propagating direction of one of the beams;

a Faraday rotator, which receives the beams with orthogonal polarizations output from the two birefringent crystals, rotates the polarizations of the beams by a predetermined angle, and then outputs the beams;

a half-wave plate, which receives the beams output from the Faraday rotator, rotating the polarizations of the beams by the predetermined angle in the opposite direction, and outputting the beams; and a birefringent crystal, which is installed on the same side as the first optical port for receiving the beams with orthogonal polarizations output from the half-wave plate and combining them into one beam propagating toward the first optical port;

wherein the beam reflected by the first optical port is split by the birefringent crystal into two beams with orthogonal polarizations, the half-wave plate rotates their polarizations by the predetermined angle, the non-reciprocal property of the Faraday rotator further rotates the beams with orthogonal polarizations by the predetermined angle so that the two beams are shifted by a different amount from the two beams output from the second optical port and the third optical port and unable to enter the second optical port and the third optical port.

4. The three-port optical polarization combiner of claim 3, wherein the two birefringent crystals are two wedge birefringent crystals with their slant surfaces disposed in parallel and facing the second optical port and the third optical port for receiving the beams output from the two ports.

5. The three-port optical polarization combiner of claim 3, wherein the optical axes of the two birefringent crystals are perpendicular to each other.

6. The three-port optical polarization combiner of claim 3, wherein the two birefringent crystals form a Wollaston lens.

7. The three-port optical polarization combiner of claim 6, wherein the two parts of the Wollaston lens allow the beams output from the second optical port and the third optical port to pass through.

8. The three-port optical polarization combiner of claim 6, wherein the Wollaston lens controls the shifted distance of the beams by adjusting the angle of the wedge.

9. The three-port optical polarization combiner of claim 3, wherein the predetermined angle is 45 degrees.

10. The three-port optical polarization combiner of claim 9, wherein the angle between the optical axis of the half-wave plate and the beam polarization is 22.5 degrees.

* * * * *